Patented Sept. 18, 1951

2,568,189

UNITED STATES PATENT OFFICE 2,568,189

LIQUID COATING COMPOSITION

John R. Fisher, Jr., Dayton, Ohio, assignor to Industrial Metal Protectives, Inc., Dayton, Ohio, a corporation of Delaware No Drawing. Application November 9, 1949, Serial No. 126,452

9 Claims. (Cl. 260—20)

This invention relates to corrosion resisting coatings. More particularly, it relates to coatings which are continuous and insulate the base metal against the action of constituents found in the atmosphere and in water. Still more particularly, it relates to an improved protective coating composition and the process for manufacturing same.

Protective coatings for surfaces, to be effective, must be continuous. The dried coatings must be insoluble in liquid mediums with which they come in contact and be impervious to corrosive elements. In addition, the coatings must have high tenacity for the base to withstand abrasion and shock incident to the normal use.

In my application, Serial No. 790,233, filed December 6, 1947, entitled "Coating Composition and Method of Making," there was disclosed an improved protective coating consisting of resin, vegetable drying oil, driers, and zinc dust.

This composition has excellent corrosion resistance, tenacity and flexibility. While these properties are excellent, the surface hardness and abrasion resistance fell short of that desired for certain purposes.

It is an object of the present invention to overcome the limitations and disadvantages of the methods heretofore utilized.

It is another object of this invention to provide a coating of improved surface hardness.

It is a further object to provide a coating of increased abrasion resistance.

It is another object of the present invention to provide a coating which can be prepared in advance of use.

It is still another object of this invention to provide a coating which may be rapidly air dried to tough adherent films.

It is a further object of this invention to produce an anti-corrosion coating using finely divided metal powders which, if used as a base coat, permits superimposing of additional coatings without intermediate treatments.

It is another object of the present invention to provide a simple method of preparing a coating composition containing finely divided metals which do not rapidly oxidize and gel.

These and other objects and advantages will become apparent from the following description:

The improved coating composition is prepared by mixing at room temperature a solution of a low acid resin, a solution of a modified synthetic resin, such as a modified alkyd resin, a solvent capable of dissolving both types of resin, metallic drier, an aromatic distillation residue, and finely divided metallic powder.

This composition or suspension can be applied by spraying, by brushing, or by dipping. The coating applied may be hardened by either air drying or force drying methods. If the composition is utilized as an undercoat, it may be overlaid with enamels, wrinkle finishes, or any of the industrial finishes. As an undercoat, the composition needs only a short period for surface drying, following which an overcoat can be directly applied, and both coatings simultaneously baked to dryness.

Heretofore anti-corrosion coatings or primers have customarily been thoroughly dried and in addition many of such coatings must have additional treatments to render them satisfactory for the application of finished coats to avoid ultimate destruction of the finished coats by the primer coat or the formation of bubbles, lumps, etc. under the finish coat.

The coating of the present invention, when used as a primer coat, has developed the unexpected property of permitting the finish coat being applied after a few minutes of air drying of the primer, without any further treatment of the primer.

It is also possible to bake both the primer coat and the finish coat simultaneously, thereby eliminating one baking and a large amount of expensive handling of mass production items on conveyor lines.

After four hours of air drying, the coating of this invention is hard enough to allow packing and shipping of the articles. In twelve hours the coating has acquired its final hardness which is essentially higher than coatings produced heretofore. If the production is to be accelerated, it is advisable to use forced drying. The final coating obtained thereby, however, is not at all superior to those finished by air drying.

Baking or forced drying may be carried out at temperatures in the range of approximately 200° F. to 400° F., the preferred temperature being at about 225° F. In the latter case a drying time of about one hour suffices. If drying is carried out with infra-red light, heating for only 15 minutes may be found necessary.

The low-acid resins operative for the process and products of this invention are those having an acid number of, or below 7, and preferably below 5. For instance, melamine formaldehyde resins, phenol formaldehyde resins, alkyd resins, particularly of the phthalic acid-glycerol type, Glyptal resins, ester gums, and dammar gums are among those which have been found satisfactory. These resins are preferably used in the form of a 50 to 60 per cent solution.

Vegetable drying oils, such as oiticica oil, tung oil, dehydrated castor oil, linseed oil, raw or blown, perilla oil are all operative in the compositions of this invention.

Xylol, toluol, naphtha, mineral spirits, and petroleum solvents are the solvents preferred for the compositions of this invention.

As the drier, a mixture of cobalt and lead naphthenates and/or a mixture of cobalt and lead linoleates, in the form of a 4 per cent solution, have been found satisfactory. A portion of these driers may also be replaced by the corresponding manganese salts.

The modified synthetic resins which impart the hardness and abrasion resistance to this composition are preferably modified alkyld resins, such as phenol modified alkyl resin or maleic acid modified alkyl resin.

The commonest form of alkyl resin and the one most extensively used in commerce is the condensation product formed by the reaction of phthalic acid with glycerol and similar polyhydroxy compounds.

The preferred resin is the phenol modified phthalic acid-glycerol reaction product, which product is utilized in this composition in quantities ranging from 10 to 40 per cent by weight of the resin content of the composition.

A number of aromatic distillation residues have proven satisfactory as inhibitors of the oxidation of the composition. Creosote oil in particular is preferred. Such equivalent material as naphthols, di-pentene and the like may be used for this purpose. The quantity of the inhibitor will vary in accordance with the time delay desired between mixing and use.

In general, quantities ranging from approximately .005 per cent to approximately 0.25 per cent may be used. A quantity corresponding to 0.1 per cent by weight of the composition has been found to increase storage life by 6 to 12 months.

The finely divided powder used in this coating composition may be comminuted metals, such as zinc, lead, aluminum, magnesium, cadmium, or alloys thereof. For the intended use powders such as zinc have a fineness such that 90 per cent averages less than 6 microns in size.

In other words, material is of such fineness that 90 per cent will pass through a U. S. standard 400 mesh sieve. Preferably, the powder should average 3 microns or smaller. Finely comminuted powders of this type will constitute approximately 100 to 350 per cent by weight of the solution in which the powders are mixed.

The following proportions of ingredients were found to give satisfactory results:

60 to 70 fl. ozs. low-acid resin solution containing 50 to 60 per cent resin
5 to 25 fl. ozs. modified synthetic resin
16 to 24 fl. ozs. solvent
½ fl. oz. cobalt drier
½ fl. oz. lead drier
16 to 20 lbs. zinc dust
.05 to 2 fl. ozs. creosote oil The compositions are illustrated by the following examples:

Example I 1486 lbs. phthalic acid-glycerol resin solution containing 50 to 60 per cent resin
476 lbs. phenol modified phthalic acid-glycerol resin
574 lbs. VM&P naphtha
453 lbs. Stoddard solvent
14 lbs. lead drier (naphthanate or linoleate)
8 lbs. cobalt (naphthanate or linoleate)
1 pint creosote oil
Zinc dust

Example II 64 fl. ozs. phenol formaldehyde resin solution containing 50 to 60 per cent resin
8 fl. ozs. maleic acid modified alkyd resin
16 fl. ozs. VM&P naphtha
½ fl. oz. cobalt linoleate
½ fl. oz. lead naphthanate
⅓ fl. oz. creosote oil
20 lbs. zinc dust All of the above mixtures were applied on articles to be coated and then allowed to air dry; air dried for about 10 minutes; and then baked as described.

The coatings obtained by the treatment above described are considerably improved as to such characteristics as hardness, abrasion resistance and related properties.

It will be understood that while there have been given herein certain specific examples of the practice of this invention, it is not intended thereby to have this invention limited to or circumscribed by the specific details of materials, proportions, or conditions herein specified, in view of the fact that this invention may be modified according to individual preference or conditions without necessarily departing from the spirit of this disclosure and the scope of the appended claims.

I claim:

1. A liquid coating composition comprising a dispersion of 16 to 20 pounds zinc dust, the particle size of which is not larger than 6 microns and having an average particle size of 3 microns at least 90 per cent of which is capable of passing through a U. S. standard 400 mesh screen dispersed in 60 to 70 fluid ounces solution containing 50 to 60 per cent low acid resin of the class consisting of melamine formaldehyde resins, phenol formaldehyde resins, phthalic acid-glycerol resin, ester gum resins and dammar gum resins having an acid number not exceeding 7 in said solution, said solution further containing 5 to 25 fluid ounces modified synthetic resin of the class consisting of phenol modified alkyd resin and maleic acid modified alkyd resin ranging from 10 to 40 per cent by weight of the resin content of the entire composition, 16 to 24 fluid ounces solvent and about 1 fluid ounce drier.

2. A liquid coating composition comprising a dispersion of 16 to 20 pounds zinc dust, the particle size of which is not larger than 6 microns and having an average particle size of 3 microns at least 90 per cent of which is capable of passing through a U. S. standard 400 mesh screen dispersed in 60 to 70 fluid ounces solution containing 50 to 60 per cent low acid resin of the class consisting of melamine formaldehyde resins, phenol formaldehyde resins, phthalic acid-glycerol resin, ester gum resins and dammar gum resins having an acid number not exceeding 7 in said solution, said solution further containing 5 to 25 fluid ounces modified synthetic resin of the class consisting of phenol modified alkyd resin and maleic acid modified alkyd resin ranging from 10 to 40 per cent by weight of the resin content of the entire composition, 16 to 24 fluid ounces solvent and about ½ fluid ounce cobalt drier and ½ fluid ounce lead drier.

3. A liquid coating composition comprising a dispersion of 16 to 20 pounds zinc dust, the particle size of which is not larger than 6 microns and having an average particle size of 3 microns at least 90 per cent of which is capable of passing through a U. S. standard 400 mesh screen dispersed in 60 to 70 fluid ounces solution containing 50 to 60 per cent low acid resin of the class consisting of melamine formaldehyde resins, phenol formaldehyde resins, phthalic acid-glycerol resin, ester gum resins and dammar gum resins having an acid number not exceeding 7 in said solution, said solution further containing 5 to 25 fluid ounces modified synthetic resin of the class consisting of phenol modified alkyd resin and maleic acid modified alkyd resin ranging from 10 to 40 per cent by weight of the resin content of the entire composition, 16 to 24 fluid ounces solvent and about 1 fluid ounce drier and .05 to 2 fluid ounces creosote oil.

4. A liquid coating composition comprising zinc dust, the particle size of which is not larger than 6 microns and having an average particle size of 3 microns at least 90 per cent of which is capable of passing through a U. S. standard 400 mesh screen, said zinc dust constituting 100 to 350 per cent by weight of the solution in which it is mixed, dispersed in a solution comprising about 1486 pounds phthalic acid glycerol resin, about 476 pounds phenol modified phthalic acid-glycerol resin, about 574 pounds naphtha, about 453 pounds stoddard solvent and about 14 pounds lead drier and about 8 pounds cobalt drier.

5. A liquid coating composition comprising zinc dust, the particle size of which is not larger than 6 microns and having an average particle size of 3 microns at least 90 per cent of which is capable of passing through a U. S. standard 400 mesh screen, said zinc dust constituting 100 to 350 per cent by weight of the solution in which it is mixed, dispersed in a solution comprising about 1486 pounds phthalic acid glycerol resin, about 476 pounds phenol modified phthalic acid-glycerol resin, about 574 pounds naphtha, about 453 pounds stoddard solvent and about 14 pounds lead drier and about 8 pounds cobalt drier and about 1 pint creosote oil.

6. A liquid coating composition comprising about 20 pounds zinc dust, the particle size of which is not larger than 6 microns and having an average particle size of 3 microns at least 90 per cent of which is capable of passing through a U. S. standard 400 mesh screen dispersed in about 64 fluid ounces solution containing 50 to 60 per cent phenol formaldehyde resin, 8 fluid ounces maleic acid modified alkyd resin, about 16 fluid ounces naphtha, and about 1 fluid ounce drier.

7. A liquid coating composition comprising about 20 pounds zinc dust, the particle size of which is not larger than 6 microns and having an average particle size of 3 microns at least 90 per cent of which is capable of passing through a U. S. standard 400 mesh screen dispersed in about 64 fluid ounces solution containing 50 to 60 per cent phenol formaldehyde resin, 8 fluid ounces maleic acid modified alkyd resin, 16 fluid ounces naphtha and about ½ fluid ounce cobalt linoleate and about ½ fluid ounce lead naphthanate.

8. A liquid coating composition comprising about 20 pounds zinc dust, the particle size of which is not larger than 6 microns and having an average particle size of 3 microns at least 90 per cent of which is capable of passing through a U. S. standard 400 mesh screen dispersed in about 64 fluid ounces solution containing 50 to 60 per cent phenol formaldehyde resin, 8 fluid ounces maleic acid modified alkyd resin, about 16 fluid ounces naphtha, and about 1 fluid ounce drier and about ⅓ fluid ounce creosote oil.

9. A liquid coating composition comprising about 20 pounds zinc dust, the particle size of which is not larger than 6 microns and having an average particle size of 3 microns at least 90 per cent of which is capable of passing through a U. S. standard 400 mesh screen dispersed in about 64 fluid ounces solution containing 50 to 60 per cent phenol formaldehyde resin, 8 fluid ounces maleic acid modified alkyd resin, about 16 fluid ounces naphtha, and about ½ fluid ounce cobalt linoleate and about ½ fluid ounce lead naphthanate and about ⅓ fluid ounce creosote oil.

JOHN R. FISHER, JR.

REFERENCES CITED

The following references are of record in the file of this patent:

UNITED STATES PATENTS

| Number | Name | Date |
| --- | --- | --- |
| 1,942,757 | Iliff et al. | Jan. 9, 1934 |
| 2,326,623 | Crosby | Aug. 10, 1943 |
| 2,343,925 | Pike | Mar. 14, 1944 |
| 2,346,624 | Straus | Apr. 11, 1944 |
| 2,353,058 | Mitchell | July 4, 1944 |
| 2,436,420 | Clayton | Feb. 24, 1948 |
| 2,493,020 | Osdal et al. | Jan. 3, 1950 |
| 2,509,875 | McDonald | May 30, 1950 |